3,187,004
HALOGENATED ALKYL AND ARYL SUBSTITUTED GLYCOLURILS

Frank B. Slezak, Painesville, and Henry Bluestone, University Heights, Ohio, assignors to Diamond Alkali Company, Cleveland, Ohio, a corporation of Delaware
No Drawing. Filed May 1, 1961, Ser. No. 106,505
2 Claims. (Cl. 260—309.7)

This invention relates to novel alkyl and aryl substituted glycolurils and novel N-halogenated analogs of these compounds and to their preparation and application.

More specifically, this invention relates to novel polysubstituted glycolurils of the structure:

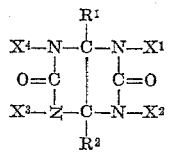

wherein $X^1$, $X^2$, $X^3$, and $X^4$ are selected from the group consisting of hydrogen, halogen, n-alkyl, isoalkyl, aryl, and aralkyl; when at least one of $X^1$, $X^2$, $X^3$, and $X^4$ is halogen, $R^1$ and $R^2$ are selected from the group consisting of hydrogen and alkyl with $R^1$ and $R^2$ not being equal when $X^1$, $X^2$, $X^3$, and $X^4$ are all halogen; when $X^1$, $X^2$, $X^3$, $X^4$ are hydrogen, $R^1$ and $R^2$ are different alkyl radicals; when none of $X^1$, $X^2$, $X^3$, and $X^4$ is halogen and, in addition, $X^1$ is other than hydrogen or n-alkyl containing more than one carbon atom, $R^1$ and $R^2$ are both hydrogen.

Specific illustrative compounds embodying this invention are:

3a-ethyl-6a-methylglycoluril

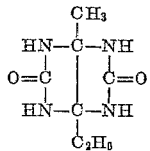

1,3-dimethylglycoluril

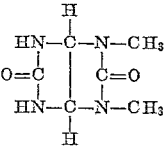

1-isopropylglycoluril

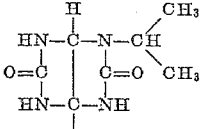

1,3-diisopropylglycoluril

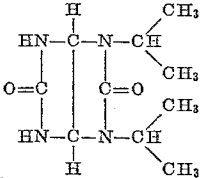

1,4-diisoproylglycoluril

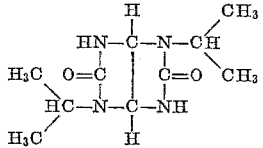

1,6-diisopropylglycoluril

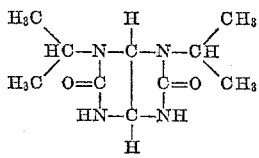

1-benzylglycoluril

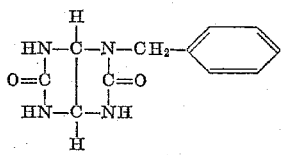

1-phenylglycoluril

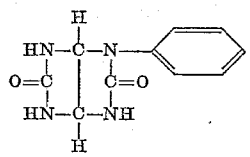

1,4-diphenylglycoluril

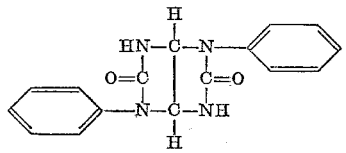

1,6-diphenylglycoluril

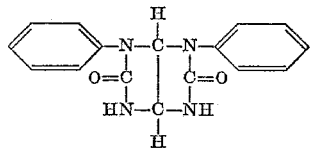

1,4-dibenzylglycoluril

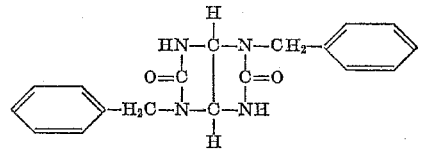

1,6-dibenzylglycoluril

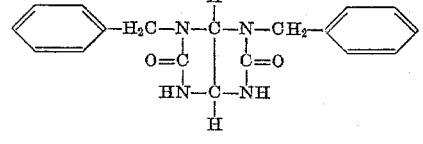

1,3,4,6-tetrachloro-3a-methylglycoluril

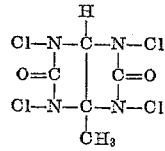

1,3,4,6-tetrachloro-3a-ethyl-6a-methylglycoluril

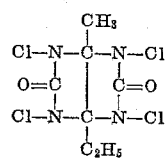

4,6-dichloro-1,3-dimethylglycoluril

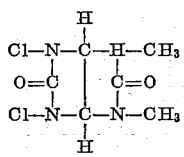

3,4,6-trichloro-1-isopropylglycoluril

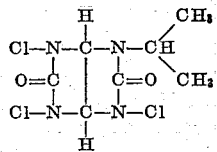

4,6-dichloro-1,3-diisopropylglycoluril

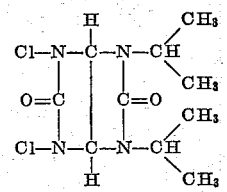

3,6-dichloro-1,4-diisopropylglycoluril

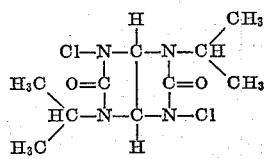

3,4-dichloro-1,6-diisopropylglycoluril

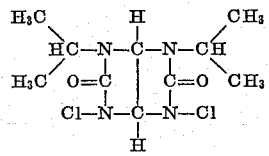

1-(n-butyl)-3,4,6-trichloroglycoluril

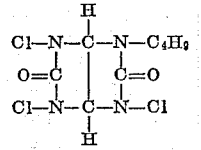

1-benzyl-3,4,6-trichloroglycoluril

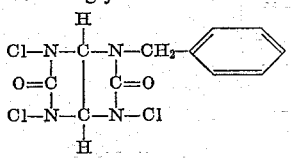

1-phenyl-3,4,6-trichloroglycoluril

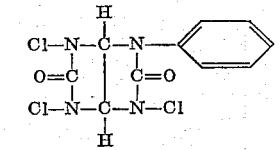

The N-chlorinated glycolurils of this invention have a high available chlorine content and are characterized by a singular activity as sanitizers, i.e., in applications wherein the compound employed reduces the number of microorganisms on an inanimate object or surface to a safe level, and in disinfecting and bactericidal applications generally, as well as in various biologically active compositions such as fungicides and nematocides. Of particular interest is the sanitizing activity of compounds of this invention which is further enhanced by the fact that compounds of this invention generally are solids and thus inherently provide a significant improvement over many prior conventional sanitizing agents including the well-known and widely used sodium hypochlorite solution. Moreover, the fact that compounds of this invention are soilds, provides increased convenience by way of easier handling, reduced likelihood of incurring damage by breakage, freezing, or spilling.

The novel alkyl and aryl substituted glycolurils of this invention are useful as intermediates in preparing the novel N-halogenated analogs of these compounds. In general, the novel unhalogenated glycolurils may be prepared by one of two methods, depending on whether the two urea-derived portions of the molecule have the same or different substitutents on the nitrogen atoms.

If the substituents on the two urea-derived portions of the molecule are identical, the compound may be prepared from a vicinal dicarbonyl compound (e.g., a 1,2-dialdehyde, 2-ketoaldehyde or vicinal diketone) and urea in aqueous acid solution. At least a 2:1 ratio of urea to dicarbonyl compound is required and the ratio may be as high as 5:1. Acids suitable for use in the reaction include hydrochloric acid, sulfuric acid, acetic acid and the like. The reaction may be carried out at temperatures between 0° and 110° C.; it is often carried out at the boiling points of the solution, but lower temperatures may be used if desired. Depending on temperatures and other conditions used in the reaction, the time required may vary from 10 minutes to 3 days.

If the two urea-derived portions of the molecule contain different substituents, the reaction is carried out in two steps with the monoureide of the dicarbonyl compound as an intermediate. The reaction between the monoureide and the substituted urea is carried out as previously described in an aqueous acid solution. The molar ratio of monoureide is typically in the range 1:1 to 1:2. The reaction may be carried out at a temperature in the range of 0° to 110° C., preferably at the boiling point of the solution. The time required for the reaction is ordinarily from 10 minutes to 2 hours.

Products prepared as hereinbefore described may be purified by recrystallization from an appropriate solvent. Typical solvents which may be used for this purpose are alcohols, e.g., methanol, ethanol or isopropanol; ethers, e.g., ethyl ether or tetrahydrofuran; ketones, e.g., acetone and methyl ethyl ketone, and the like.

The N-halogenated alkyl and aryl substituted glycolurils generally may be prepared by halogenating an alkyl or aryl substituted glycoluril desirably in an aqueous alkaline solution, rendered alkaline by addition of an alkali-metal carbonate, e.g., sodium carbonate; alkali-metal bicarbonates, e.g., sodium bicarbonate or alkali-metal hydroxides, e.g., sodium hydroxide, preferably a alkali-metal hydroxide, all as will be described more specifically hereinafter. The ratio of glycoluril to halogen is in the range of about 1:2 to 1:6.

One of the most advantageous applications of compounds of this invention is in compositions useful in sterilizing and bacterial toxicant applications, hence, it will be understood that compounds of this invention are useful when mixed with water and, in certain instances, with other liquids to yield materials suitable for sterilizing and disinfecting such as in the treatment of food containers, e.g., metal and other type containers used in the transport of food products such as milk, cream and the like as well as in oxidizing-type detergents for use in hospitals and other places such as hotels and restaurants for dishwashing and the like where a product having a high available chlorine content is desirable.

Accordingly, in view of the variety of advantageous applications of compounds of this invention, it will be understood that the novel N-halogenated glycolurils may be employed as ingredients in compositions which also contain a major or minor, although usually a major proportion, of other substances preferably readily water soluble, such as alkali metal salts, alkaline earth metal salts, and/or other alkali salts such as alkali metal phosphates, e.g., sodium or potassium phosphates, and the like. The alkaline materials serve to provide a desirable pH at which the compounds are often more soluble and, in many instances, also provides advantageous detergent or washing properties in solution.

In this connection, it will be appreciated that various alkaline phosphates including alkali metal phosphates and alkaline earth metal phosphates useful in detergent compositions, such as sodium tripolyphosphates, sodium pyrophosphates, sodium triphosphates, and the like may be incorporated into compositions advantageously including also one or more compounds of this invention.

In addition to these detergent ingredients, it will be further understood that various organic wetting agents, such as alkyl aryl sulfonates, e.g., sodium dodecyl benzyl sulfonate, or other wetting agents or surface active materials may be included as well as soaps, fillers, abrasives and water softening agents of organic or inorganic type incorporated as desired to provide specific properties required in a particular application.

Further, it will be appreciated that compositions of this invention particularly adapted in the sterilization, disinfectant and detergent applications may either be dry particulate materials ranging from finely divided powders to granular materials of increased particle size to pastes and liquid slurries and/or solutions, depending on the application intended.

It would be appreciated, of course, that in a variety of applications contemplated for compounds of this invention the proportions of these compounds with respect to the other ingredients employed can be varied. However, it may be stated that in many applications the novel N-halogenated glycolurils of this invention desirably will comprise minor amounts of about 1% by weight or less up to about 10% based on the mole composition employed. Frequently, in amounts constituting a small, but effective, quantity appreciably less than 1% up to a much greater proportion dictated by a number of factors including cost, application, equipment and other considerations, e.g., as high as 100% in certain instances where the pure material is advantageously utilized.

The N-halogenated glycolurils of this invention having a high available chlorine content are useful in sanitizing or disinfecting the water in swimming pools. These compounds, due to the presence of alkyl and/or aryl substituents are only slightly soluble in water.

The majority of swimming pool disinfectants, being quite soluble in water, must be introduced into the pool by means of metering devices or other costly and cumbersome control systems. The limited solubility of the compounds of this invention causes them to be self-regulating with regard to their dissolution in water. One way in which the N-halogenated alkyl and/or aryl substituted glycolurils may be introduced into the water is by passing the make-up and recirculating water flowing into the pool through a bed of the glycoluril. The glycoluril may also be formed into a block or rod which can be immersed in the water. In either application the water will gradually dissolve the glycoluril, thus maintaining a desired level of chlorine in the pool.

The N-halogenated glycolurils of this invention are also effective as pesticides for controlling fungi, bacteria, and nematodes.

While it is possible to apply the compounds of the present invention in undiluted form to the plant or other material to be protected, it is frequently desirable to apply the novel glycolurils in admixture with either solid or liquid inert, pesticidal adjuvants. Thus, the glycolurils can be applied to the plants for fungicidal purposes, for example, by spraying them with aqueous or organic solvent dispersions of the glycolurils. The choice of an appropriate solvent is determined largely by the concentration of active ingredient which it is desired to employ, by the volatility required in a solvent, the cost of the solvent and the nature of the material being treated. Among the many suitable organic solvents which can be employed as carriers for the present pesticides, there may be mentioned hydrocarbons such as benzene, toluene, xylene, kerosene, diesel oil, fuel oil, petroleum, naphtha, chlorinated hydrocarbons, such as carbon tetrachloride, chloroform, trichloroethylene, perchlorethylene, esters such as ethyl acetate, amyl acetate and butyl acetate.

The glycolurils can also be applied to plants and other materials along with inert solid fungicidal adjuvants or carriers such as talc, pyrophyllite, Attaclay, kieselguhr, chalk, diatomaceous earth, lime, calcium carbonate, bentonite and fuller's earth.

It is frequently desirable to incorporate a surface active agent in the pesticidal compositions of this invention. Such surface active agents are advantageously employed in both the solid and liquid compositions. The surface active agent can be anionic, cationic or nonionic in character.

Typical classes of surface active agents include alkyl sulfonates, alkylaryl sulfonates, alkyl sulfates, alkylamide sulfonates, fatty acid esters of polyhydric alcohols, ethylene oxide addition products of such esters; sodium alkyl benzene sulfonates having 14 to 18 carbon atoms, and soaps, e.g., sodium stearate and sodium oleate.

The solid and liquid formulations can be prepared in any suitable method. Thus, the active ingredients, in finely divided form if a solid, may be tumbled together with finely divided solid carrier. Alternatively, the active ingredient in liquid form, including solutions, dispersions, emulsions and suspensions thereof, may be admixed with the solid carrier in finely divided form in amounts small enough to preserve the free-flowing property of the final dust composition.

When solid compositions are employed, in order to obtain a high degree of coverage with a minimum dosage of the formulation, it is desirable that the formulation be in finely divided form. The dust containing active ingredient usually should be sufficiently fine that substantially all will pass through a 20 mesh Tyler sieve. A dust which passes through a 200 mesh Tyler sieve also is satisfactory.

For dusting purposes, preferably formulations are employed in which the active ingredient is present in an amount of 5 to 50% of the total by weight. However, concentrations outside this range are operative and compositions containing from 1 to 99% of active ingredient by weight are contemplated, the remainder being carrier and/or any other additive or adjuvant material which may be desired. It is often advantageous to add small percentages of surface active agents, e.g., 0.5 to 1% of the total composition by weight, to dust formulations, such as the surface active agents previously set forth.

For spray application, the active ingredient may be dissolved or dispersed in a liquid carrier, such as water or other suitable liquid. The active ingredient can be in the form of a solution, suspension, dispersion or emulsion in aqueous or nonaqueous medium. Desirably, 0.5 to 1.0% of a surface active agent by weight is included in the liquid composition.

For adjuvant purposes, any desired quantity of surface active agent may be employed, such as up to 250% of the active ingredient by weight. If the surface active agent is used only to impart wetting qualities, for example, to the spray solution, as little as 0.05% by weight or less of the spray solution need be employed. The use of larger amounts of surface active agent is not based upon wetting properties but is a function of the physiological behavior of the surface active agent. These considerations are particularly applicable in the case of the treatment of plants. In liquid formulations the active ingredient often constitutes not over 30% by weight of the total and may be 10%, or even as low as 0.01%.

The novel N-halogenated glycolurils of the present invention can be employed in compositions containing other pesticides, more especially fungicides, insecticides and bactericides, e.g., phenothiazine, pyrethrum, rotenone, DDT, etc.

The term "available chlorine," as employed throughout the specification and claims, is intended to refer to that chlorine which is attached directly to nitrogen or oxygen. Since each such positively charged chlorine undergoes a 2-electron change upon reaction, it behaves as if it were $Cl_2$ and, therefore, the amount of effective chlorine available for reaction is $2xCl^+$. The "percent available chlorine" of such a compound thus becomes twice the weight percent of chlorine attached to nitrogen or oxygen.

In order that those skilled in the art may more completely understand the present invention and the preferred methods by which the same may be carried into effect, the following specific examples are offered.

EXAMPLE I

Preparation of 3a-methylglycoluril

Commercial 37% pyruvic aldehyde solution (320 g., 1.6 moles), urea (480 g., 8.0 moles), water (800 ml.) and concentrated hydrochloric acid (16 ml.) are mixed in a two-liter beaker and heated to a gentle boil. The insoluble product begins to form gradually above 80°. After boiling gently about 15 minutes, the mixture is cooled and finally chilled in ice before the tan solid is filtered off. The solid is washed with water and alcohol and finally dried to give 70.8 g. (28.7%) of 3a-methylglycoluril melting at 258–259°. Chemical analysis indicates preparation of the desired $C_5H_8N_4O_2$ and is as follows:

| Element | Percent calculated | Percent actual |
|---|---|---|
| C | 38.5 | 39.4 |
| H | 5.2 | 5.1 |

EXAMPLE II

Preparation of 3a-ethyl-6a-methylglycoluril

A mixture of 2,3-pentanedione (86 g., 0.86 mole), urea (172 g., 2.9 moles), water (900 ml.) and concentrated hydrochloric acid (25 ml.) are shaken together and then are allowed to stand at room temperature. The product starts to form within five minutes. After standing two days, the solid is filtered off, washed by boiling with 300 ml. of water and dried to give 80 g. (50%) of 3a-ethyl-6a-methylglycoluril melting at 320–321° with decomposition. Chemical analysis indicates preparation of the desired $C_7H_{12}N_4O_2$ and is as follows:

| Element | Percent calculated | Percent actual |
|---|---|---|
| C | 45.6 | 45.9 |
| H | 6.6 | 6.4 |

EXAMPLE III

Preparation of glyoxalmonoureide

Commercial 30% glyoxal solution (3000 g., 15.5 moles) is neutralized to a pH of 7.1 by the addition of 111 g. of sodium carbonate in small portions over a 5-hour period. A 5-liter, 3-necked flask furnished with a mechanical stirrer and a vacuum take-off tube is arranged for heating with a 5-gallon water bath maintained at 35–40°. Urea (1500 g., 25 mole) is placed into the flask and the neutralized glyoxal solution is added. The stirred mixture becomes cold as the urea goes into solution and then gradually warms to 40° as reaction takes place. After stirring at 40° and under vacuum for about 40 hours, the solid present in the mixture is filtered off and the filtrate is chilled to give another crop of solid. The combined solids are washed with methanol and dried to give 757 g. (42%) of glyoxalmonoureide melting at 146°. Concentration of the filtrate to about 2 liters gives an additional 54 g. (3%) of lower purity glyoxalmonoureide melting at 140–141°.

EXAMPLE IV

Preparation of 1,3-dimethylglycoluril

Glyoxalmonoureide (41.3 g., 0.35 mole), 1,3-dimethylurea (35.1 g., 0.4 mole), water (175 ml.) and concentrated hydrochloric acid (3.5 ml.) are boiled gently for one hour. The cooled solution is evaporated to dryness on a 50° water bath and under vacuum. The residue is triturated with 30 ml. of ethanol, filtered and dried. Recrystallization of the crude residue (30 g.) from ethanol (120 ml.) gives 18 g. of material which after a second recrystallization using decolorizing carbon gives 16 g. (27%) of 1,3-dimethylglycoluril melting at 254–256°. Chemical analysis indicates preparation of the desired $C_6H_{10}N_4O_2$ and is as follows:

| Element | Percent calculated | Percent actual |
|---|---|---|
| C | 42.4 | 42.5 |
| H | 5.9 | 5.8 |

EXAMPLE V

Preparation of 1-isopropylglycoluril

Glyoxalmonoureide (59 g., 0.5 mole), 1-isopropylurea (51 g., 0.5 mole), water (200 ml.) and concentrated hydrochloric acid (5 ml.) are boiled gently for about one-half hour and then allowed to cool. The resulting solid is filtered, dried, and recrystallized from 1100 ml. of ethanol to give 34 g. (37%) of 1-isopropylglycoluril, M.P. 248–249°. Chemical analysis indicates preparation of the desired $C_7H_{12}N_4O_2$ and is as fololws:

| Element | Percent calculated | Percent actual |
|---|---|---|
| C | 45.6 | 45.7 |
| H | 6.6 | 6.6 |

EXAMPLE VI

Preparation of 1,3-diisopropylglycoluril

Glyoxalmonoureide (11.8 g., 0.1 mole), diisopropylurea (14.4 g., 0.1 mole), water (250 ml.), concentrated hydrochloric acid (3 ml.) and 1 g. of detergent (Neutral 50) are maintained at a vigorous boil for about 30 minutes. During this time the solids go into solution. After cooling, filtration gives 16 g. (71%) of 1,3-diisopropylglycoluril, a white solid melting at 300–302° with decomposition. Boiling a portion of the solid with water raises the melting point to 312–313°. Recrystallization from ethanol raises the M.P. to 315°. Chemical analysis indicates preparation of the desired $C_{10}H_{18}N_4O_2$ and is as follows:

| Element | Percent calculated | Percent actual |
|---|---|---|
| C | 53.1 | 53.0 |
| H | 8.0 | 7.8 |

EXAMPLE VII

Preparation of 1,4- and/or 1,6-diisopropylglycoluril

Commercial 30% glyoxal solution (40 g., 0.2 mole), isopropylurea (51 g., 0.5 mole), water (150 ml.), and concentrated hydrochloric acid (5 ml.) are heated at a gentle boil for about 30 minutes. After cooling, filtering and drying, 18 g. (40%) of crude product, M.P. 296–297°, is obtained. Recrystallization from ethanol gives 14.5 g. (32%) of 1,4- and/or 1,6-diisopropylglycoluril, M.P. 306–307°. Chemical analysis indicates preparation of the desired $C_{10}H_{18}N_4O_2$ and is as follows:

| Element | Percent calculated | Percent actual |
|---|---|---|
| C | 53.1 | 52.2 |
| H | 8.0 | 7.8 |

EXAMPLE VIII

*Preparation of 1-(n-butyl)glycoluril*

Glyoxalmonoureide (59 g., 0.5 mole), n-butylurea (90 g., 0.8 mole), water (300 ml.) and concentrated hydrochloric acid (10 ml.) are boiled gently for 15 minutes. The solution is filtered hot to remove dirt and the filtrate is cooled to give 54.4 g. (55%) of crude product, M.P. 259–260°. Recrystallization from 740 ml. of ethanol gives 31.2 g. (31.5%) of 1-(n-butyl)-glycoluril, M.P. 267–268°. Chemical analysis indicates preparation of the desired $C_8H_{14}N_4O_2$ and is as follows:

| Element | Percent calculated | Percent actual |
|---|---|---|
| C | 48.5 | 48.8 |
| H | 7.1 | 6.9 |

EXAMPLE IX

*Preparation of 1-benzylglycoluril*

Glyoxalmonoureide (24 g., 0.2 mole), benzylurea (28 g., 0.2 mole), water (300 ml.) and concentrated hydrochloric acid (5 ml.) are boiled gently for about one hour. After cooling, filtering and washing, there is obtained 38 g. (82%) of crude product, M.P. 273–274°. Recrystallization from ethanol gives 30 g. (65%) of pure product, M.P. 283–284°. Chemical analysis indicates preparation of the desired $C_{11}H_{12}N_4O_2$ and is as follows:

| Element | Percent calculated | Percent actual |
|---|---|---|
| C | 56.9 | 56.8 |
| H | 5.2 | 5.1 |

EXAMPLE X

*Preparation of 1-phenylglycoluril*

Glyoxalmonoureide (29.5 g., 0.25 mole), phenylurea (34 g., 0.25 mole), water (500 ml.), and concentrated hydrochloric acid (7 ml.), and Neutral 50 detergent (1 g.) are stirred at a gentle boil for 30 minutes. The mixture is cooled, the solid filtered off, dried, boiled with ethanol (200 ml.), filtered and dried to give 44.8 g. (82%) of 1-phenylglycoluril, M.P. 300°. Chemical analysis indicates preparation of the desired $C_{10}H_{10}N_4O_2$ and is as follows:

| Element | Percent calculated | Percent actual |
|---|---|---|
| C | 55.0 | 55.3 |
| H | 4.6 | 4.8 |

EXAMPLE XI

*Preparation of 1,4- and/or 1,6-diphenylglycoluril*

Commercial 30% glyoxal solution (10 g., 0.05 mole), phenylurea (13.6 g., 0.1 mole), water (100 ml.) and concentrated hydrochloric acid (2–3 ml.) are maintained at a gentle boil for 15–20 minutes. After cooling the brown solid is extracted three times with 150 ml. portions of boiling ethanol. The dry, cream-colored product melting at 310–311° weighs 5.3 g. (35%). Chemical analysis indicates preparation of the desired $C_{16}H_{14}N_4O_2$ and is as follows:

| Element | Percent calculated | Percent actual |
|---|---|---|
| C | 65.3 | 63.4 |
| H | 4.8 | 5.2 |

EXAMPLE XII

*Preparation of 1,4- and/or 1,6-dibenzylglycoluril*

Commercial 30% glyoxal (10 g., 0.05 mole), benzylurea (15 g., 0.1 mole), water (100 ml.) and concentrated hydrochloric acid (2–3 ml.) are maintained at a gentle boil for 15–20 minutes. After cooling, the yellow solid is filtered, dried, dissolved in 500 ml. of boiling ethanol and the resulting solution cooled to give 3.5 g. (22%) of solid, M.P. 288°. An additional recrystallization from ethanol raises the M.P. to 303–305°. Chemical analysis indicates preparation of the desired $C_{18}H_{18}N_4O_2$ and is as follows:

| Element | Percent calculated | Percent actual |
|---|---|---|
| C | 67.1 | 67.0 |
| H | 5.6 | 5.5 |

General procedure for preparing the N-chlorinated glycolurils

A stirred suspension of the glycoluril in water is treated with chlorine while 1 or 3 N sodium hydroxide solution is added at such a rate as to maintain the pH of the mixture in the range 8–9. The resulting solid is filtered off, washed with water, dried and weighed.

EXAMPLE XIII

*Preparation of 1,3,4,6-tetrachloro-3a-methylglycoluril*

3a-methylglycoluril (15.6 g., 0.1 mole) in water (2 liters) is treated with chlorine (32 g., 0.44 mole) over a 1.25 hour period to give 26.2 g. (87.3%) of 1,3,4,6-tetrachloro-3a-methylglycoluril, melting point 140–143° and containing 96.5% available chlorine. (Theoretical is 96.5%.) Recrystallization from carbon tetrachloride raises the melting point to 147–148°. Chemical analysis indicates preparation of the desired $C_5H_4Cl_4N_4O_2$ and is as follows:

| Element | Percent calculated | Percent actual |
|---|---|---|
| C | 20.4 | 20.5 |
| H | 1.4 | 1.6 |

EXAMPLE XIV

*Preparation of 1,3,4,6-tetrachloro-3a-ethyl-6a-methylglycoluril*

3a-ethyl-6a-methylglycoluril (18.4 g., 0.1 mole) in water (2 liters) maintained at 35° with a water bath is treated with chlorine (32 g., 0.45 mole) over a 1.4 hour period to give 29.8 g. (92.5%) of 1,3,4,6-tetrachloro-3a-ethyl-6a-methylglycoluril, melting point 183–185° and containing 82.6% available chlorine. Recrystallization of an analytical sample from benzene raises the melting point to 205–208° and the available chlorine content to 86.7% (Theoretical is 87.8%.) Chemical analysis indicates preparation of the desired $C_7H_8Cl_4N_4O_2$ and is as follows:

| Element | Percent calculated | Percent actual |
|---|---|---|
| C | 26.1 | 26.6 |
| H | 2.5 | 2.5 |

EXAMPLE XV

*Preparation of 4,6-dichloro-1,3-dimethylglycoluril*

A solution of 1,3-dimethylglycoluril (3.4 g., 0.02 mole) in 150 ml. of water is treated with chlorine (4 g., 0.056 mole) over a 30-minute period. The resulting solid is filtered off and the filtrate concentrated to 75–100 ml. under vacuum on a 30–35° water bath. The resulting solid is filtered off and dried and the combined solids give 3.7 g. (77%) of crude product, melting point 114–116° and containing 59.1% available chlorine. (Theoretical is 59.2%.)

EXAMPLE XVI

*Preparation of 3,4,6-trichloro-1-isopropylglycoluril*

1-isopropylglycoluril (9.2 g., 0.05 mole) in water (900 ml.) cooled by an ice bath is treated with chlorine (12 g., 0.1 mole) over a one-hour period to give 12.6 g. (87.5%) of crude product, melting point 120–122° and containing 72.2% available chlorine. (Theoretical is 74.7%.) Recrystalization from a chloroform-carbon tetrachloride mixture gives fine white crystals, melting point 125–126°. Chemical analysis indicates preparation of the desired $C_7H_9Cl_3N_4O_2$ and is as follows:

| Element | Percent calculated | Percent actual |
|---|---|---|
| C | 29.2 | 29.5 |
| H | 3.2 | 3.4 |
| Cl | 36.9 | 36.7 |

EXAMPLE XVII

*Preparation of 4,6-dichloro-1,3-diisopropylglycoluril*

1,3-diisopropylglycoluril (11.3 g., 0.05 mole) in water (900 ml.) is treated with chlorine (9 g., 0.127 mole) over a one-hour period to give 14.7 g. (99%) of crude, 4,6-dichloro-1,3-diisopropylglycoluril, melting point 148–149° and containing 46.1% available chlorine. (Theoretical 48.0%.) Recrystallization from benzene does not improve the melting point or the available chlorine content. Chemical analysis indicates preparation of the desired $C_{10}H_{16}Cl_2N_4O_2$ and is as follows:

| Element | Percent calculated | Percent actual |
|---|---|---|
| C | 40.7 | 41.4 |
| H | 5.4 | 5.7 |
| Cl | 24.1 | 23.1 |

EXAMPLE XVIII

*Preparation of dichloro-1,4- and/or 1,6-diisopropylglycoluril*

A suspension of 1,4- and/or 1,6-diisopropylglycoluril (2.3 g., 0.01 mole) in water (200 ml.) is treated with chlorine (2 g., 0.028 mole) over a 40-minute period to give 2.6 g. (95%) of crude dichloro-1,4- and/or 1,6-diisopropylglycoluril, melting point 139–140° and containing 45.2% available chlorine. (Theoretical is 48.0%.) Recrystallization attempts from benzene, carbon tetrachloride, chloroform or mixtures of these solvents does not improve the purity of the product.

EXAMPLE XIX

*Preparation of 1-(n-butyl)-3,4,6-trichloroglycoluril*

1-(n-butyl)glycoluril (2 g., 0.01 mole) in water (200 ml.) cooled by an ice bath is treated with chlorine (3 g., 0.043 mole) during 30 minutes. The white product which results is taken up in chloroform (100 ml.), separated from the water, the chloroform concentrated to 15 ml. (using a 35° water bath and water aspirator vacuum), carbon tetrachloride (50 ml.) added and concentration continued at room temperature to a volume of 5 ml. The white solid is filtered and dried to give 2.8 g. (93%) of 1-(n-butyl)-3,4,6-trichloroglycoluril, melting point 67–68° and containing 68% available chlorine. (Theoretical is 68.5%.) Chemical analysis indicates preparation of the desired $C_8H_{11}Cl_3N_4O_2$ and is as follows:

| Element | Percent calculated | Percent actual |
|---|---|---|
| C | 31.9 | 32.2 |
| H | 3.7 | 3.9 |
| Cl | 35.3 | 35.1 |

EXAMPLE XX

*Preparation of 1-benzyl-3,4,6-trichloroglycoluril*

1-benzylglycoluril (11.6 g., 0.05 mole) in one liter of water is treated with chlorine (15 g., 0.21 mole) over a 60–90 minute period to give 16.3 g. (99%) of 1-benzyl-3,4,6-trichloroglycoluril, melting point 155–156° and containing 61.5% available chlorine. (Theoretical is 63.4%.) One gram is recrystallized from 58 ml. of benzene to give fine white crystals, melting point 160–161°. Chemical analysis indicates preparation of the desired $C_{11}H_9Cl_3N_4O_2$ and is as follows:

| Element | Percent calculated | Percent actual |
|---|---|---|
| C | 39.4 | 39.8 |
| H | 2.7 | 3.0 |
| Cl | 31.8 | 31.5 |

EXAMPLE XXI

*Preparation of 1-phenyl-3,4,6-trichloroglycoluril*

1-phenylglycoluril (2.2 g., 0.01 mole) in water (200 ml.) maintained at 50° by a water bath is treated with chlorine (4 g., 0.056 mole) over a 30–60 minute period to give 2.7 g. (84%) of 1-phenyl-3,4,6-trichloroglycoluril, melting point 133–134° and containing 62.6% available chlorine. (Theoretical is 66.1%.) Recrystallization from a chloroform-hexane mixture gives fine white needles, melting point 140–141°. Chemical analysis indicates preparation of the desired $C_{10}H_7Cl_3N_4O_2$ and is as follows:

| Element | Percent calculated | Percent actual |
|---|---|---|
| C | 37.4 | 37.3 |
| H | 2.2 | 2.3 |

EXAMPLE XXII

*Foliage protectant and eradicant tests*

The tomato foliage disease test measures the ability of the test compound to protect tomato foliage against infection by the early blight fungus *Alternaria solani* (Ell. and Mart.) Jones and Grout and the late blight fungus *Phytophthora infestans* (Mont.) de Bary. Results from this test indicate whether a compound may have practical use as a foliage protectant fungicide. The method used is a modification of that described by McCallan and Wellman and employs tomato plants (var. Bonny Best) five to seven inches high which are four to six weeks old. Duplicate plants, one set for each test fungus, are sprayed with various dosages of a formulation containing 0.4 g. of the test compound, 8 ml. acetone, 4 ml. stock emulsifier solution (6.5% Triton X–155 by volume) and 187.6 ml. distilled water at 40 pounds air pressure while being rotated on a turntable in a hood. The center of the turntable is 45 inches from the nozzle of the spray gun.

After the spray deposit is dry, treated plants and controls (sprayed with formulation less toxicant) are sprayed while being rotated on a turntable with a spore suspension containing approximately 20,000 conidia of *A. solani* per ml., or 150,000 sporangia of *P. infestans* per ml. The atomizer used delivers 20 ml. in the 30-second exposure period. The plants are held in a saturated atmosphere for 24 hours at 70° F. for early blight and 60° F. for late blight to permit spore germination and infection before removal to the greenhouse.

After two days from the start of the test for early blight and three days for late blight, lesion counts are made on the three uppermost fully expanded leaves. The data are converted to percentage disease control based on the number of lesions obtained on the control plants. Dosages and percent disease control are given in Table I.

½ ml. of bacterial suspension for each respective test organism is added to each test tube. The medication tubes are then set aside at room temperature for four hours. After this exposure period transfers are made by means of a standard four mm. platinum loop to 7 ml. of sterile broth into test tubes arranged in racks similar to those for the medication tubes. The broth tubes are then incubated for 48 hours at 29° to 31° C. at which time growth is measured by use of a Bausch & Lomb spectronic "20" direct reading colorimeter. A reading is recorded for each test tube after shaking. Usually three replicates of each organism serve as controls. Calculations are made on percent of the mean check readings.

TABLE 1

| Compound | Early blight | | Late blight | |
|---|---|---|---|---|
| | Dosage in p.p.m. | Percent control | Dosage in p.p.m. | Percent control |
| 1,3,4,6-tetrachloro-3a-methylglycoluril | 400 | 95 | 400 | 100 |
| 1,3,4,6-tetrachloro-3a-ethyl-6a-methylglycoluril | 64 | 53 | 8 | 34 |
| 3,4,6-trichloro-1-isopropylglycoluril | 400 | 76 | 2,000 | 100 |
| 4,6-dichloro-1,3-diisopropylglycoluril | 64 | 58 | 64 | 58 |
| 1-(n-butyl)-3,4,6-trichloroglycoluril | 400 | 75 | 2,000 | 100 |
| Dichloro-1,4 and/or 1,6-diisopropylglycoluril | 2,000 | 94 | | |
| 1-benzyl-3,4,6-trichloroglycoluril | 64 | 70 | 128 | 84 |
| 1-phenyl-3,4,6-trichloroglycoluril | 128 | 44 | 128 | 55 |

EXAMPLE XXIII

Test chemicals are examined for ability to inhibit the growth of four bacterial species, *Erwinia amylovora* (*E.a.*), *Xanthomonas phaseoli* (*X.p.*), *Micrococcus pyrogenes* var. *aureus* (*M.a.*, *Escherichia coli* (*E.c.*), at various dosages. A formulation containing 0.1 gram of the test chemical, 4 ml. acetone, 2 ml. stock emulsifier solution (0.5% Triton X–155 in water by volume) and 74 ml. distilled water (total volume 80 ml., concentration of toxicant—1250 p.p.m.) is diluted without maintaining the concentration of the emulsifier or solvent. The first two and fourth above named test species are Gram negative rods, the third species is Gram positive. They are all cultures on nutrient agar slants except *X. phaseoli* which is grown on potato dextrose agar. The cultures used for tests are subcultured for two sequential 24-hour periods to insure uniform test populations. Bacterial suspensions are made from the second subculture in the culture tube by addition of distilled water and gentle agitation after which they are filtered through double layers of cheesecloth and adjusted to standard concentrations by turbimetric measurement. Each of four test tubes arranged in a rack receive one ml. of the 1250 p.p.m. test formulation. After the test formulations have been measured into a test tube 3½ ml. of distilled water and This figure subtracted from 100 gives percent control as compared to checks. Dosages and percent control are given in Table II.

TABLE II

| Compound | Dosage in p.p.m. | Percent control | | | |
|---|---|---|---|---|---|
| | | E.a. | X.p. | M.a. | E.c. |
| 1,3,4,6-tetrachloro-3a-methylglycoluril | 1 | 100 | 100 | 100 | 100 |
| | 0.25 | 25 | 71 | 70 | 38 |
| 1,3,4,6-tetrachloro-3a-ethyl-6a-methylglycoluril | 1 | 85 | 90 | 77 | 100 |
| | 0.25 | 73 | 68 | 72 | 30 |
| 3,4,6-trichloro-1-isopropylglycoluril | 1 | 100 | 100 | 100 | 100 |
| | 0.25 | 63 | 39 | 33 | 35 |
| 4,6-dichloro-1,3-diisopropylglycoluril | 1 | 57 | 39 | 33 | 20 |
| 1-(n-butyl)-3,4,6-trichloroglycoluril | 1 | 100 | 80 | 84 | 100 |
| | 0.25 | 37 | 79 | 17 | 25 |
| Dichloro-1,4 and/or 1,6-diisopropylglycoluril | 16 | 45 | 85 | 67 | 63 |
| 1-benzyl-3,4,6-trichloroglycoluril | 1 | 100 | 100 | 100 | 100 |
| | 0.25 | 39 | 34 | 43 | 38 |
| 1-phenyl-3,4,6-trichloroglycoluril | 1 | 66 | 100 | 100 | 100 |
| | 0.25 | 52 | 79 | 0 | 38 |

EXAMPLE XXIV

Non-plant parasitic nematodes *Panagrellus redivivus* are exposed to the test chemical in small watch glasses, U.S. Bureau of Plant Industry's model (27 mm. dia. x 8 mm. deep), within a 9 cm. Petri dish. Three watch glasses are used, two of these receive appropriate dosages of the test formulation containing 0.1 g. or 0.1 ml. of the test compound, 4 ml. acetone, 2 ml. stock emulsifier solution (0.5% Triton X–155 by volume), 74 ml. distilled water at 1250 p.p.m. and the third, which is in the center between the others, receives 0.4 ml. of distilled water. After all of the test dishes have been set up in this manner a 0.1 ml. of Panagrellus suspension is added to each watch glass bringing the concentration down to exactly 1000 p.p.m. After these additions are made the Petri dishes are closed. The watch glass in the center of each dish, containing only water and nematodes, detects fumigant action. The other two containing chemical and nematodes measure contact activity. The total amount of toxicant in the Petri dish is one mg. for fumigant action. A one to ten dilution is made of the 1250 p.p.m. formulation for the lower concentration.

The organism is grown on cooked oatmeal which is sterilized in the autoclave before being centrally inoculated from an old culture. The culture is held at 22° C. and after 10 to 14 days the surface of the oatmeal is swarming with nematodes which are visible to the eye. Such a culture is used to prepare the test suspension. The concentration of the nematodes is adjusted so that each watch glass contains 30 to 40 nematodes. At the end of 48 hours mortality counts are made from which percent kill can be determined. Dosages and percent kill are given in Table III.

TABLE III

| Compound | Contact dosage in p.p.m. | Percent kill |
|---|---|---|
| 1,3,4,6-tetrachloro-3a-methylglycoluril | 100 | 100 |
| 1,3,4,6-tetrachloro-3a-ethyl-6a-methylglycoluril | 100 | 100 |
| 3,4,6-trichloro-1-isopropylglycoluril | 100 | 100 |
| 4,6-dichloro-1,3-diisopropylglycoluril | 100 | 54 |
| 1-(n-butyl)-3,4,6-trichloroglycoluril | 100 | 100 |
| Dichloro-1,4 and/or 1,6-diisopropylglycoluril | 100 | 50 |
| 1-benzyl-3,4,6-trichloroglycoluril | 100 | 100 |
| 1-phenyl-3,4,6-trichloroglycoluril | 100 | 100 |

It is to be understood that although the invention has been described with specific reference to particular embodiments thereof, it is not to be so limited, since changes and alterations therein may be made which are within the full intended scope of this invention as defined by the appended claims.

What is claimed is:
1. 1-benzyl-3,4,6-trichloroglycoluril.
2. 3,4,6-trichloro-1-phenylglycoluril.

References Cited by the Examiner
UNITED STATES PATENTS

| | | | |
|---|---|---|---|
| 2,392,505 | 1/46 | Rogers | 260—309.5 |
| 2,596,126 | 5/52 | Carhart | 260—309.7 |
| 2,628,174 | 2/53 | Stokes et al. | 260—309.7 |
| 2,633,469 | 3/53 | Adkins et al. | 260—309.7 |
| 2,638,434 | 5/53 | Adkins | 260—309.7 |
| 2,649,389 | 8/53 | Williams | 260—309.7 |
| 2,654,763 | 10/53 | Adkins | 260—309.7 |
| 3,008,936 | 11/61 | Kamlet | 260—309.7 |
| 3,019,075 | 1/62 | Rosen et al. | 260—309.7 |
| 3,019,160 | 1/62 | Slezak et al. | 260—309.7 |

FOREIGN PATENTS

| | | |
|---|---|---|
| 831,853 | 4/60 | Great Britain. |
| 1,020,024 | 11/57 | Germany. |

OTHER REFERENCES

Slezak et al.: Jour. Org. Chem., vol. 25, pages 660–61 (April 1960).

IRVING MARCUS, *Primary Examiner.*

D. T. McCUTCHEN, NICHOLAS RIZZO, *Examiners.*